(12) United States Patent
Janssens et al.

(10) Patent No.: US 10,937,140 B2
(45) Date of Patent: Mar. 2, 2021

(54) FAIL-SAFE DETECTION USING THERMAL IMAGING ANALYTICS

(71) Applicant: FLIR Systems, Inc., Wilsonville, OR (US)

(72) Inventors: Koen Janssens, Aaigem (BE); Pieter Messely, Ronse (BE)

(73) Assignee: FLIR SYSTEMS, INC., Wilsonville, OR (US)

( * ) Notice: Subject to any disclaimer, the term of this patent is extended or adjusted under 35 U.S.C. 154(b) by 0 days.

(21) Appl. No.: 16/293,432

(22) Filed: Mar. 5, 2019

(65) Prior Publication Data

US 2019/0206042 A1 Jul. 4, 2019

Related U.S. Application Data

(63) Continuation of application No. PCT/US2017/054162, filed on Sep. 28, 2017.
(Continued)

(51) Int. Cl.
*G06T 7/00* (2017.01)
*H04N 7/18* (2006.01)
(Continued)

(52) U.S. Cl.
CPC ........ *G06T 7/0002* (2013.01); *G06K 9/00771* (2013.01); *G06K 9/00785* (2013.01);
(Continued)

(58) Field of Classification Search
CPC ......... G06T 7/0002; G06T 7/254; G06T 7/13; G06K 9/00771; G06K 9/00785;
(Continued)

(56) References Cited

U.S. PATENT DOCUMENTS 8,558,889 B2 10/2013 Martin et al.
8,982,670 B1 3/2015 Pappafotis et al.
(Continued)

FOREIGN PATENT DOCUMENTS

CN 103226712 7/2013
CN 104539899 4/2015
(Continued)

*Primary Examiner* — Joseph G Ustaris
*Assistant Examiner* — Matthew David Kim
(74) *Attorney, Agent, or Firm* — Haynes and Boone, LLP (57) ABSTRACT

Various techniques are provided to process captured thermal images to determine whether the thermal images exhibit degradation associated with environmental effects and/or security conditions. In one example, a method includes capturing a plurality of thermal images of a scene. The thermal images are processed to generate first and second background images associated with first and second time periods to filter out changes in the scene occurring within the associated time periods. The first and second background images are edge filtered to generate first and second edge images. The first and second edge images are compared to determine a change in edges associated with the scene. A device is selectively operated in a fail-safe mode in response to the comparing. Additional methods and related systems are also provided.

20 Claims, 5 Drawing Sheets

Related U.S. Application Data (60) Provisional application No. 62/401,702, filed on Sep. 29, 2016.

(51) Int. Cl.
| | |
|---|---|
| *G06K 9/46* | (2006.01) |
| *G06T 7/254* | (2017.01) |
| *G06K 9/00* | (2006.01) |
| *G06T 7/13* | (2017.01) |
| *G08G 1/07* | (2006.01) |
| *H04N 5/33* | (2006.01) |
| *H04N 17/00* | (2006.01) |

(52) U.S. Cl.
CPC ............ *G06K 9/4604* (2013.01); *G06T 7/13* (2017.01); *G06T 7/254* (2017.01); *G08G 1/07* (2013.01); *H04N 5/33* (2013.01); *H04N 7/188* (2013.01); *H04N 17/002* (2013.01); *G06T 2207/10048* (2013.01); *G06T 2207/20024* (2013.01); *G06T 2207/20212* (2013.01); *G06T 2207/30168* (2013.01); *G06T 2207/30236* (2013.01)

(58) Field of Classification Search
CPC .......... G06K 9/4604; G08G 1/07; H04N 5/33; H04N 7/188; H04N 17/002
USPC ......................................................... 348/143
See application file for complete search history.

(56) References Cited

U.S. PATENT DOCUMENTS

| | | | |
|---|---|---|---|
| 2005/0232512 A1* | 10/2005 | Luk ................. | G06K 9/6293 382/276 |
| 2007/0247526 A1 | 10/2007 | Flook et al. | |
| 2007/0274402 A1 | 11/2007 | Ibrahim et al. | |
| 2013/0027550 A1 | 1/2013 | Evangelio et al. | |
| 2014/0362222 A1* | 12/2014 | Swaminathan ...... | G08G 1/0145 348/149 |
| 2016/0125268 A1* | 5/2016 | Ebiyama ............. | G06K 9/6212 382/218 |

FOREIGN PATENT DOCUMENTS

| | | |
|---|---|---|
| WO | WO 2009/029051 | 3/2009 |
| WO | WO 2012/170953 | 12/2012 |
| WO | WO 2014/061922 | 4/2014 |

* cited by examiner

FAIL-SAFE DETECTION USING THERMAL IMAGING ANALYTICS

CROSS-REFERENCE TO RELATED APPLICATIONS

This application is a continuation of International Patent Application No. PCT/US2017/054162 filed Sep. 28, 2017 and entitled "FAIL-SAFE DETECTION USING THERMAL IMAGING ANALYTICS," which is incorporated herein by reference in its entirety.

International Patent Application No. PCT/US2017/054162 filed Sep. 28, 2017 claims priority to and the benefit of U.S. Provisional Patent Application No. 62/401,702 filed Sep. 29, 2016 and entitled "FAIL-SAFE DETECTION USING THERMAL IMAGING ANALYTICS," which is hereby incorporated by reference in its entirety.

TECHNICAL FIELD

The present invention relates generally to thermal imaging and, more particularly, to the operation of thermal imaging devices in response to environmental conditions.

BACKGROUND

Thermal cameras are often used to help monitor and detect activities of interest in various environments. For example, in the case of traffic management, a thermal camera may capture thermal images of a traffic intersection. Object detection processing may be performed on the captured thermal images to detect, for example, the presence of a vehicle waiting for a traffic signal at the traffic intersection. If the vehicle is detected by such processing, a control system may operate the traffic signal to permit the vehicle to proceed through the traffic intersection.

If the captured thermal images are degraded or otherwise unsatisfactory, the control system may not operate in a predictable or desirable manner. For example, if a thermal camera is positioned in an outside environment, it may be exposed to changing and detrimental environmental conditions. Such conditions may include, for example, the presence of rain, snow, debris, or other material that blocks or obscures the thermal camera's field of view. In another example, the thermal camera may be moved such that its field of view changes, for example, due to wind, physical impacts, human manipulation, or other factors.

In any of these cases, objects that are actually present in an area of interest (e.g., a vehicle waiting at an intersection) may not necessarily be identified by the object detection processing. In this regard, the vehicle may be obscured due to material in the thermal camera's field of view, or the vehicle may not even be present in the thermal camera's field of view due to a physical rotation or translation of the thermal camera that causes it to capture a different field of view. As a result, the vehicle may not be properly identified by the object detection processing. Thus, the control system may not operate the traffic signal in response to the vehicle, and the vehicle may therefore remain waiting at the traffic signal for an excessive or indefinite period of time.

Moreover, in the above-noted examples, the thermal camera itself may actually be operating properly and may continue to provide thermal images to appropriate processing and control systems. However, the captured images themselves remain unsatisfactory. As a result, conventional camera failure detection systems that rely on loss of signal or power cannot be used to remedy the above-noted problems.

SUMMARY

Various techniques are provided to process captured thermal images to determine whether the thermal images exhibit degradation associated with environmental effects and/or security conditions. For example, a control system may be selectively switched to operate in a fail-safe mode if the processing determines that the thermal images cannot be reliably used for object detection. Such techniques may be used in a variety of different applications including, for example, the monitoring of thermal traffic cameras.

In an embodiment, a method includes capturing a plurality of thermal images of a scene; processing the thermal images to generate first and second background images associated with first and second time periods to filter out changes in the scene occurring within the associated time periods; edge filtering the first and second background images to generate first and second edge images; comparing the first and second edge images to determine a change in edges associated with the scene; and selectively operating a device in a fail-safe mode in response to the comparing.

In another embodiment, a system includes a thermal camera configured to capture a plurality of thermal images of a scene; a memory component configured to store the thermal images and a plurality of machine readable instructions; and a processor configured to execute the machine readable instructions to: process the thermal images to generate first and second background images associated with first and second time periods to filter out changes in the scene occurring within the associated time periods, edge filter the first and second background images to generate first and second edge images, compare the first and second edge images to determine a change in edges associated with the scene, and selectively operate a device in a fail-safe mode in response to the compare.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIGS. 3A-7B illustrate various thermal images processed to determine whether a fail-safe condition has occurred in accordance with embodiments of the disclosure.

Embodiments of the present invention and their advantages are best understood by referring to the detailed description that follows. It should be appreciated that like reference numerals are used to identify like elements illustrated in one or more of the figures.

DETAILED DESCRIPTION

Techniques are provided to perform analytics on captured thermal images to determine whether a fail-safe condition has occurred. In some embodiments, one or more thermal cameras may be used to capture thermal images of a scene of interest. For example, a thermal camera may be implemented as a traffic camera positioned to capture thermal images of a traffic intersection to facilitate vehicle detection and corresponding control of a traffic signal system (e.g., one or more traffic lights) associated with the intersection.

The thermal images are processed in a manner that permits changes in the scene to be measured in an efficient and reliable manner to determine whether a fail-safe condition has occurred. Such processing may include, for example, performing a plurality of different background detection processes on the thermal images to generate background images associated with different time periods. For example, the thermal images may be selectively weighted and selectively combined with each other to provide background images that represent the overall background of the scene corresponding to a long time period (e.g., one or more weeks or months), a medium time period (e.g., one or more minutes or hours), and a short time period (e.g., one or more milliseconds or seconds) as further discussed herein.

The generated background images may be edge filtered to provide high contrast in the edges (e.g., contours) depicted in the various background images. The edge filtered images may be further subsampled to remove minor inconsequential differences in the images (e.g., due to small vibrations experienced by the thermal camera which result in the various background images becoming slightly misaligned relative to each other). The subsampled images associated with the different time periods may be compared with each other to determine changes in the edges exhibited by the subsampled images.

For example, if the thermal camera has recently become blocked or obscured (e.g., due to environmental conditions occurring within recent minutes or hours), then a medium term subsampled image (e.g., corresponding to a medium time period) may exhibit fewer edges than a long term subsampled image (e.g., corresponding to a long time period. In this regard, the thermal images recently captured while the thermal camera is obscured will have changed the medium term subsampled image but not the long term subsampled image. If a sufficient number of edges have changed, then it may be determined that the thermal camera has experienced an environmental blocking/obscuring event and is no longer providing reliable images of the scene. As a result, a control system, such as a traffic control system, may switch (e.g., change) to operating one or more traffic signals in a fail-safe mode where the thermal images are no longer relied upon to control the traffic signals.

As another example, if the thermal camera has recently been tampered with (e.g., due to human manipulation occurring within recent milliseconds or seconds), then the short term subsampled image (e.g., corresponding to a short time period) may exhibit fewer edges than the long term subsampled image (e.g., the thermal images recently captured during the tampering event will have changed the short term subsampled image but not the long term subsampled image). If a sufficient number of edges have changed, then it may be determined that the thermal camera has experienced an security event (e.g., a human hand briefly covering the thermal camera or the thermal camera being rapidly rotated or translated to view a different scene). As a result, a control system, such as a traffic control system, may switch to operating one or more traffic signals in a fail-safe mode where the thermal images are no longer relied upon to control the traffic signals.

Figure 1:
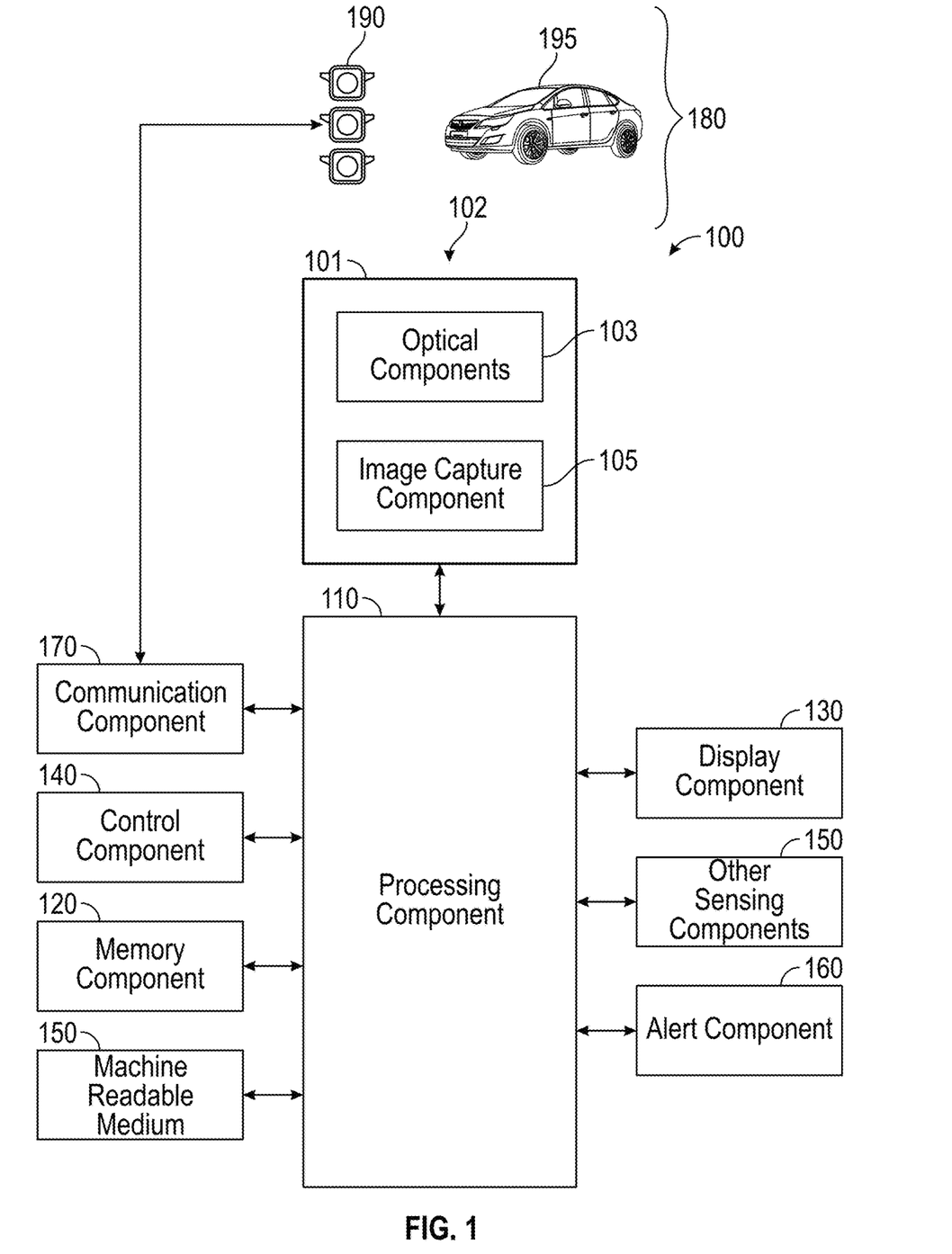
FIG. 1 illustrates a block diagram of a thermal imaging, processing, and control system in accordance with an embodiment of the disclosure.

Turning now to the drawings, FIG. 1 illustrates a block diagram of a thermal imaging, processing, and control system 100 in accordance with an embodiment of the disclosure. As shown, system 100 includes a thermal camera 101, a processing component 110, a memory component 120, a display component 130, a control component 140, a machine readable medium 150, an alert component 160, and a communication component 170.

System 100 may be used to capture and process thermal images of a scene 180 (e.g., corresponding to a traffic intersection in the illustrated embodiment) and selectively control a device 190 (e.g., corresponding to a traffic signal in the illustrated embodiment). For example, in the case of device 190 implemented as a traffic signal, such selective control may direct the movement of one or more vehicles 195 through the traffic intersection in accordance with various techniques described herein.

Although system 100 will be discussed herein primarily as a traffic control system in the context of traffic management, system 100 may be used in relation to any desired location. For example, other terrestrial locations (e.g., train station platforms, metro platforms, or parking lots) and vehicle-based locations (e.g., mounted on a land-based vehicle, a watercraft, an aircraft, a spacecraft, or other vehicle) are also contemplated. Moreover, system 100 may be used in relation to any desired type of device or system used for other applications as appropriate in addition to, or other than, traffic management.

Although system 100 will be discussed herein primarily in relation to controlling a single device 190, such control may be provided to multiple devices, one or multiple systems, and/or other objects and/or entities as appropriate. Similarly, other types of devices may be controlled as appropriate for various desired applications.

Although FIG. 1 illustrates various portions of system 100 together in a localized manner, system 100 may be implemented in a distributed manner, for example, using wired, wireless, networked, and/or other connections. For example, thermal camera 101 may be physically positioned on or near device 190 or any other appropriate location to capture images of scene 180. Similarly, processing component 110 may be implemented remote from thermal camera 101 and/or remote from scene 180 such that some or all of the processing discussed herein may be performed local and/or remote from thermal camera 101 and/or scene 180. It is also contemplated that processing component 110 may be distributed into multiple processing components 110 to perform various operations discussed herein at different physical locations.

Thermal camera 101 includes an aperture 102, optical components 103, and an image capture component 105. Thermal radiation received from scene 180 passes through aperture 102 and optical components 103 (e.g., lenses) and is received by image capture component 105 (e.g., an array of thermal detectors such as microbolometers configured to capture the thermal radiation as thermal images). Image capture component 105 may be implemented with appropriate read out circuitry (e.g., one or more read out integrated circuits) and conversion circuitry (e.g., one or more analog to digital circuits) to provide the captured thermal images as digital data to processing component 110.

In some embodiments, thermal camera 101 may be implemented with one or more additional optical components and/or image capture components to capture images corresponding to other wavelengths such as, for example, visible light, short-wave infrared, mid-wave infrared, and/or others. Accordingly, although system 100 will be primarily discussed with regard to thermal images, the various techniques discussed herein may be used in relation to images corresponding to other wavelengths such as, for example, visible light, short-wave infrared, mid-wave infrared, and/or others.

Processing component 110 may include, for example, a microprocessor, a single-core processor, a multi-core processor, a microcontroller, a logic device (e.g., a programmable logic device configured to perform processing operations), a digital signal processing (DSP) device, one or more memories for storing executable instructions (e.g., software, firmware, or other instructions), and/or any other appropriate combination of processing device and/or memory to execute instructions to perform any of the various operations described herein. Processing component 110 is adapted to interface and communicate with any of the various components of system 100 and/or other devices to perform various operations discussed herein. In various embodiments, machine readable and machine executable instructions may be provided in software and/or hardware as part of processing component 110, or code (e.g., software or configuration data) which may be stored in memory component 120 and/or machine readable medium 150 for execution by processing component 110.

Memory component 120 and machine readable medium 150 may be implemented by any desired combination of memory devices or media configured to store data and instructions in a volatile and/or non-volatile manner as appropriate, such as random access memory (RAM), read-only memory (ROM), electrically-erasable read-only memory (EEPROM), flash memory, or other types of memory or media. Such data and instructions may be provided, for example, on physical media and/or through data communications received over communication component 170.

Processing component 110 may receive thermal images from image capture component 105, perform various image processing as discussed herein, and store and retrieve the captured and processed thermal images to and from memory component 120. Processing component 110 may also provide the captured and processed images to display component 130, for example, for viewing by a user.

Display component 130 may include, for example, an image display device (e.g., a liquid crystal display (LCD)) or various other types of generally known video displays or monitors. Display component 140 may include display electronics, which may be utilized by processing component 110 to display image data and information.

Control component 140 may include, for example, one or more user input and/or interface devices having one or more user actuated components, such as one or more push buttons, slide bars, rotatable knobs or a keyboard, that are adapted to generate one or more user actuated input control signals. In some embodiments, control component 140 may be integrated as part of display component 130 to operate as both a user input device and a display device, such as, for example, a touch screen device adapted to receive input signals from a user touching different parts of the display screen. In some embodiments, processing component 110 may be adapted to sense control input signals from control component 140 and respond to any sensed control input signals received therefrom.

Control component 140 may include, for example, a control panel unit (e.g., a wired or wireless handheld control unit) having one or more user-activated mechanisms (e.g., buttons, knobs, sliders, or others) adapted to interface with a user and receive user input control signals. In some embodiments, such a control panel unit may be adapted to include one or more other user-activated mechanisms to provide various other control operations of system 100, such as auto-focus, menu enable and selection, field of view (FoV), brightness, contrast, gain, offset, spatial, temporal, and/or various other features and/or parameters.

In another embodiment, control component 140 may include a graphical user interface (GUI), which may be integrated as part of display component 130 (e.g., a user actuated touch screen), having one or more images of the user-activated mechanisms (e.g., buttons, knobs, sliders, or others), which are adapted to interface with a user and receive user input control signals via the display component 130. As an example for one or more embodiments as discussed further herein, display component 130 and control component 140 may represent appropriate portions of a tablet, a laptop computer, a desktop computer, or other type of device.

Sensing components 150 may be implemented, for example, as environmental and/or operational sensors, depending on the sensed application or implementation, which provide information to processing component 110 (e.g., by receiving sensor information from each sensing component 150). In various embodiments, sensing components 150 may be adapted to provide data and information related to environmental conditions, such as internal and/or external temperature conditions, lighting conditions (e.g., day, night, dusk, and/or dawn), humidity levels, specific weather conditions (e.g., sun, rain, and/or snow), distance (e.g., laser rangefinder), and/or whether a tunnel, a covered parking garage, or that some type of enclosure has been entered or exited. Accordingly, sensing components 150 may include one or more conventional sensors as would be known by those skilled in the art for monitoring various conditions (e.g., environmental conditions) that may have an effect (e.g., on the image appearance) on the data provided by image capture component 105.

In some embodiments, sensing components 150 may include devices that relay information to processing component 110 via wireless communication. For example, each sensing component 150 may be adapted to receive information from a satellite, through a local broadcast (e.g., radio frequency) transmission, through a mobile or cellular network and/or through information beacons in an infrastructure (e.g., a transportation or highway information beacon infrastructure) or various other wired or wireless techniques.

Alert component 160 may provide an alarm or other type of notification in response to a condition determined by processing component 110. For example, in some embodiments, processing component 110 may cause alert component 160 to provide an appropriate notification to a user if a fail-safe condition or a security condition is detected. Such notifications may be provided in various forms such as, for example, an audible signal (e.g., audible alarm), a visible signal (e.g., flashing light), and/or an electronic message (e.g., electronic message received by a mobile device, smart phone, tablet, personal digital assistant, laptop computer, desktop computer, or other type of device) may be provided.

Communication component 170 may be used to communicate with device 190 and/or other external devices in a hardwired and/or a networked manner. In the case of network-based communication, communication component 170 may be implemented, for example, as a network interface component (NIC) adapted for communication with a network including other devices in the network. In various embodiments, communication component 170 may include one or more wired or wireless communication components, such as an Ethernet connection, a wireless local area network (WLAN) component based on the IEEE 802.11 standards, a wireless broadband component, mobile cellular component, a wireless satellite component, or various other types of wireless communication components including radio frequency (RF), microwave frequency (MWF), and/or infrared frequency (IRF) components adapted for communication with a network. As such, communication component 170 may include an antenna coupled thereto for wireless communication purposes. In other embodiments, the communication component 170 may be adapted to interface with a Digital Subscriber Line (DSL) modem, a Public Switched Telephone Network (PSTN) modem, an Ethernet device, and/or various other types of wired and/or wireless network communication devices adapted for communication with a network.

In various embodiments, a network may be implemented as a single network or a combination of multiple networks. For example, in various embodiments, the network may include the Internet and/or one or more intranets, landline networks, wireless networks, and/or other appropriate types of communication networks. In another example, the network may include a wireless telecommunications network (e.g., cellular phone network) adapted to communicate with other communication networks, such as the Internet. As such, in various embodiments, system 100 and/or its individual associated components may be associated with a particular network link such as for example a URL (Uniform Resource Locator), an IP (Internet Protocol) address, and/or a mobile phone number.

Figure 2:
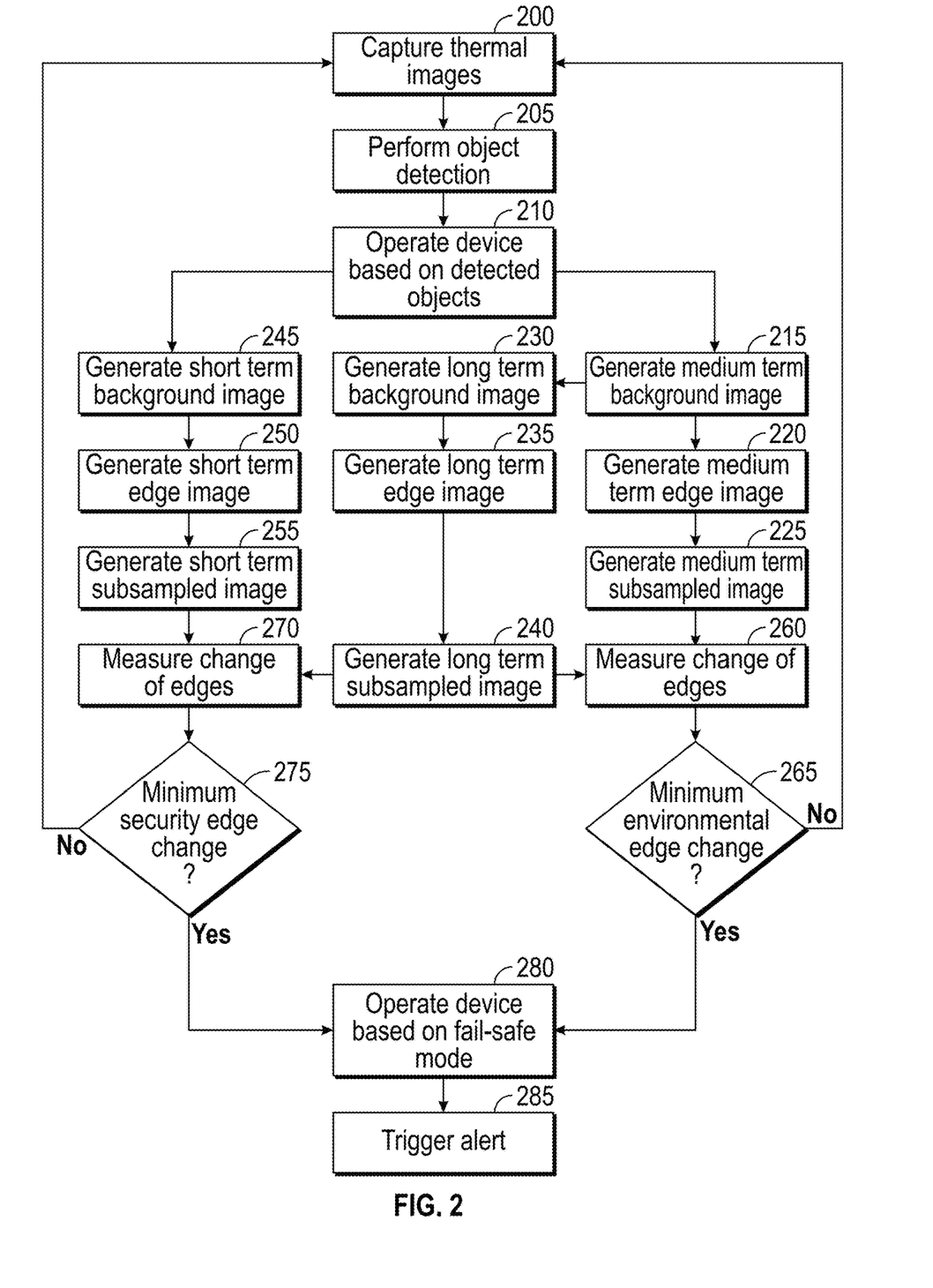
FIG. 2 illustrates various analytics processes performed on captured thermal images to determine whether a fail-safe condition has occurred in accordance with an embodiment of the disclosure.

FIG. 2 illustrates various analytics processes performed by system 100 on captured thermal images to determine whether a fail-safe condition has occurred in accordance with an embodiment of the disclosure. The use of thermal images by system 100 is particularly advantageous in that such images are generally agnostic as to day or night (e.g., thermal images captured by thermal camera 101 during daylight or nighttime hours may both be used to build up the various background images further discussed herein without introducing unwanted variations due to sunshine, moonlight, or darkness).

In block 200, thermal camera 101 captures thermal images from the particular scene 180 corresponding to the field of view seen by aperture 102. For example, if thermal camera 101 is directed toward a traffic intersection scene 180, then the captured thermal images will correspond to the traffic intersection. If thermal camera 101 has become blocked or obscured (e.g., due to debris, a human hand, or other material in front of aperture 102), then the thermal images captured in block 200 may be degraded such that vehicle 195 or other portions of the traffic intersection are no longer visible. Also, if thermal camera 101 has been moved (e.g., by environmental factors or human manipulation), then the thermal images may not correspond to the traffic intersection any more (e.g., scene 180 may correspond to a different location due to the translation or rotation of thermal camera 101).

Thermal camera 101 may continue capturing thermal images throughout the process of FIG. 2. In this regard, although thermal image capture is identified in block 200, such operations may continue throughout the process of FIG. 2 to continuously provide updated thermal images to the various illustrated processes which may also continue to operate in response to the updated thermal images to provide continuously updated background images, edge images, and subsampled images further discussed herein.

In block 205, processing component 110 receives the captured thermal images and performs object detection processing to determine the presence of one or more objects of interest in the captured thermal images. For example, in the case of a traffic management implementation, processing component 110 may detect the presence of vehicles (e.g., vehicle 195), pedestrians, or other objects of interest in the captured thermal images as appropriate.

In block 210, processing component 110 controls the operation of device 190 based on the detected objects. For example, if the processing of block 205 identifies that a vehicle is present and waiting to proceed through the traffic intersection, processing component 110 may send appropriate control signals though communication component 170 to device 190 to control the operation of device 190 and permit vehicle 195 to proceed through the traffic intersection in a timely manner. As discussed, other types of devices may be controlled as appropriate for various desired applications.

The process of FIG. 2 further includes three analytics processes that may be performed simultaneously to generate various medium term images (blocks 215 to 225), long term images (blocks 230 to 240), and short term images (blocks 245 to 255). The analytics processes may be operated continuously in response to the various thermal images captured in block 200. In this regard, newly generated medium term, long term, and short term images may be continuously generated over time during the analytics processes.

Referring now to the generation of the medium term images, in block 215, processor 110 performs a background filtering process on a plurality of the thermal images captured in block 200 to generate a medium term background image. For example, the captured thermal images may be selectively weighted and combined with each other to provide background images that represent the overall background of scene 180 corresponding to a medium time period (e.g., minutes or hours).

In this regard, the background filter process of block 215 may effectively filter out image-to-image changes that occur in scene 180 that last less than the medium time period. As a result, objects such as vehicles, pedestrians, airborne debris, and other features occurring in scene 180 may be effectively removed from the resulting medium term background images. As such, the medium term background image generated in block 215 may correspond to the features of scene 180 that remain static over the medium time period.

Figure 3A:
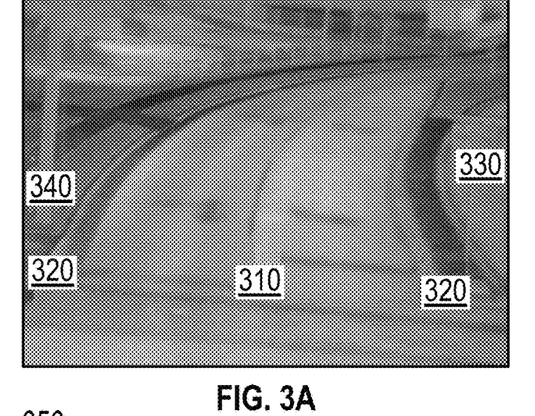

FIG. 3A illustrates an example medium term background image 300 generated by block 215. As shown, image 300 illustrates a traffic intersection with various static features viewable, such as a roadway 310, curbs 320, sign 330, and light pole 340 remaining viewable. Other temporary features such as passing vehicles and pedestrians have been effectively filtered out of image 300.

Referring again to FIG. 2, in block 220, processing component 110 operates on the generated medium term background image to provide a medium term edge image. In this regard, processing component 110 may perform an edge filtering operation on the medium term background image. Such edge filtering may include, for example, applying a Sobel filter or other appropriate processing to the medium term background image.

The resulting medium term edge image will include the edges (e.g., contours) of the various static objects in scene 180 and illustrate them in high contrast in comparison to the other portions of scene 180. For example, in some embodiments, edges may be represented using a first pixel value (e.g., white or black) and other portions may be represented using a second pixel value (e.g., black or white) that contrasts with the first pixel value.

Figure 3B:
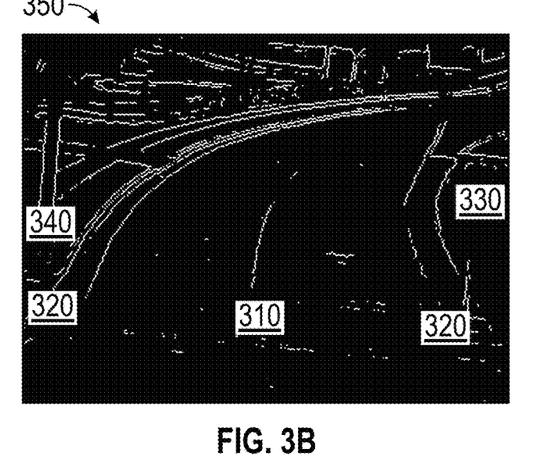

FIG. 3B illustrates an example medium term edge image 350 generated by block 220. As shown, image 350 illustrates the edges of various static features with white edge lines including roadway 310, curbs 320, sign 330, and light pole 340. The remaining features of scene 180 have been effectively smoothed out and are no longer distinguishable as a result of the edge filtering process.

Referring again to FIG. 2, in block 225, processing component 110 operates on the generated medium term edge image to provide a medium term subsampled image. In this regard, processing component 110 may perform a subsampling operation on the medium term edge image. Such subsampling may include, for example, identifying groups (e.g., neighborhoods) of pixels of the medium term edge image and assigning a single pixel value to all pixels of the group. For example, if at least one pixel of the group is associated with an edge (e.g., having a white pixel value), then all pixels of the group may be assigned the same edge pixel value. Other subsampling techniques may be used as appropriate to provide a desired level of granularity in the resulting subsampled images (e.g., various pixel group sizes may be used and various weightings of the associated pixel values may be used to determine the resulting pixel group value).

Figure 3C:
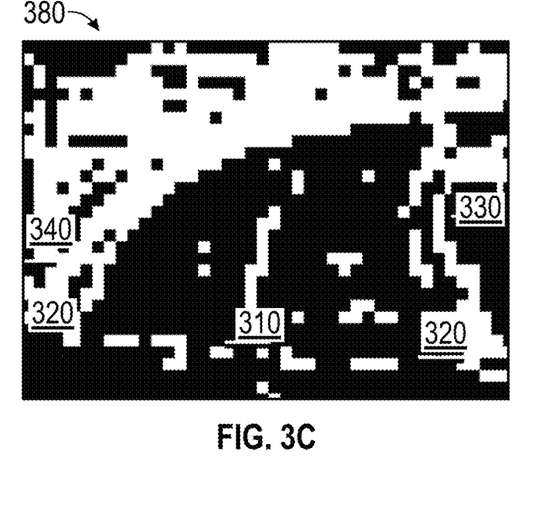

FIG. 3C illustrates an example medium term subsampled image 380 generated by block 225. As shown, image 380 still illustrates the edges of various static features with white edge lines including roadway 310, curbs 320, sign 330, and light pole 340. However, the edges of image 380 are provided at a lower resolution by virtue of the subsampling operation.

Referring now to the generation of the long term background images, in block 230, processor 110 performs a further background filtering process on a plurality of the medium term background images (provided by successive iterations of block 215) to generate a long term background image. For example, the medium term background images may be selectively weighted and combined with each other to provide a long term background image that represents the overall background of scene 180 corresponding to a long time period (e.g., weeks or months).

In this regard, the background filter process of block 230 may effectively filter out image-to-image changes that occur in scene 180 that last less than the long time period. For example, the long term background image may filter out nearly all changes except for those that remain for weeks or months (e.g., substantially all moving objects and temporary environmental changes may be filtered out, while long term seasonal changes may still be represented in the resulting long term background image).

In block 235, processing component 110 operates on the generated long term background image to provide a long term edge image in the manner previously discussed with regard to block 220. In block 240, processing component 110 operates on the generated long term edge image to provide a long term subsampled image in the manner previously discussed with regard to block 225.

In some embodiments, the various long term background images, long term edge images, and/or long term subsampled images generated during the process of blocks 230 to 240 may be stored in one or more non-volatile portions of memory component 120 and/or machine readable medium 150 to ensure that such images remain available after a power failure experienced by any portion of system 100.

Referring now to the generation of the short term background images, in block 245, processor 110 performs a background filtering process on a plurality of the thermal images captured in block 200 to generate a short term background image. For example, the captured thermal images may be selectively weighted and combined with each other to provide background images that represent the overall background of scene 180 corresponding to a short time period (e.g., milliseconds or seconds).

In this regard, the background filter process of block 245 may effectively filter out image-to-image changes that occur in scene 180 that last less than the short time period. For example, short term background image may filter out only a limited set of changes that remain for milliseconds or seconds (e.g., most rain drops and wind debris may be filtered out). However, changes such as a human being moving within the scene or a rapid rotation or translation of the thermal camera may still be represented in the resulting short term background image.

In block 250, processing component 110 operates on the generated short term background image to provide a short term edge image in the manner previously discussed with regard to block 220. In block 255, processing component 110 operates on the generated short term edge image to provide a short term subsampled image in the manner previously discussed with regard to block 225.

In view of the above discussion, it will be appreciated that following the three analytics processes discussed above, medium term subsampled images (block 225), long term subsampled images (block 240), and short term subsampled images (block 255) will have been provided for further analysis by processing component 110. The various subsampled images may be compared with each other in two different processes (corresponding to blocks 260 to 265 and blocks 270 to 275) to determine if thermal camera 101 is capturing reliable thermal images of scene 180 that may permit the object detection process of block 205 to be performed effectively, or whether processor 110 should switch to operating device 190 according to a fail-safe mode (block 280).

Referring to the first comparison process, in block 260, processor 110 compares a medium term subsampled image generated in block 225 with a long term subsampled image generated in block 240 to determine whether environmental factors have interfered to block or obscure thermal images captured by thermal camera 101. In this regard, the medium term subsampled image will include the subsampled edge details corresponding to the overall static features of scene 180 associated with the medium time period (e.g., minutes or hours). The long term subsampled image will include the subsampled edge details corresponding to the overall static features of scene 180 associated with the long time period (e.g., weeks or months).

If the edge details of the long term subsampled image are substantially the same as the edge details of the medium term subsampled image, then it can be determined that thermal camera 101 has captured reliable thermal images over the medium time period (e.g., the scene imaged over recent minutes or hours substantially matches that of previous images captured over recent weeks or months).

However, if the edge differences determined in block 260 exceed a threshold amount associated with environmental effects, processor 110 may determine that thermal camera 101 has not been capturing reliable thermal images over the medium time period (e.g., the scene imaged over recent minutes or hours significantly differs from that of previous images captured over recent weeks or months).

The comparison of block 260 may be performed in various ways. For example, in some embodiments, a pixel-to-pixel comparison can be made between the medium term and long term subsampled images to determine an overall number or percentage of pixels that differ between the images. In some embodiments, only changes associated with edges (e.g., pixels having an edge pixel value) are considered. In some embodiments, only edges missing in the medium term subsampled image are considered. In some embodiments, other or additional processing may be performed to determine edge differences between the images.

The use of subsampled images in block 260 can advantageously reduce the likelihood that small image-to-image variations might be inadvertently misinterpreted as degraded images. For example, if thermal camera 101 experiences minor movements due to, for example, temperature changes that cause a mounting mast or platform of thermal camera 101 to bend, wind buffeting that causes thermal camera 101 to shake, or other environmental factors, the edges illustrated in the edge images of blocks 220 and 235 may appear to be translated relative to each other. For example, the any of the movements noted above that occur recently might cause the medium term background image to be translated relative to the long term background image, and such translation may be evident in the corresponding edge images. Such translation of the edges may result in an incorrect comparison performed in block 260.

By using subsampled versions of the medium term and long term edge images in block 260 (and also in block 270 discussed herein), the edges will be represented at a lower resolution and will effectively smooth out small translations of the edge pixels within the subsampling pixel neighborhoods. As a result, the edge comparison can be more reliably performed. In some embodiments, the amount of subsampling performed may be selectively adjusted to properly tune the edge comparison operation to provide reliable and accurate results. Moreover, although subsampling may be advantageously used, it is also contemplated that the long term and medium term edge images may be compared in block 260 without subsampling in some embodiments.

FIGS. 4A-7B illustrate various example thermal images that further identify the comparison of subsampled images in accordance with embodiments of the disclosure.

Figure 4A:
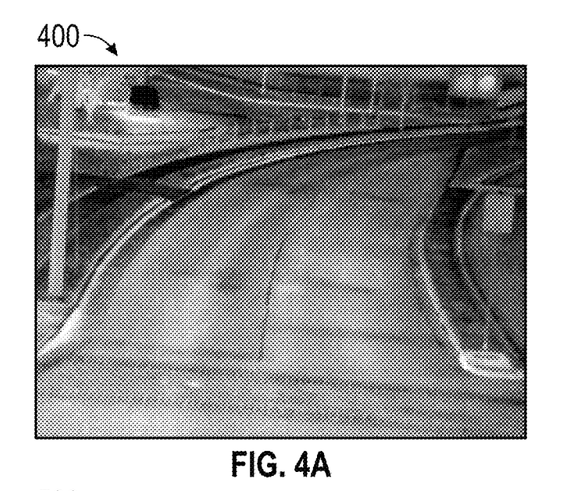
Figure 4B:
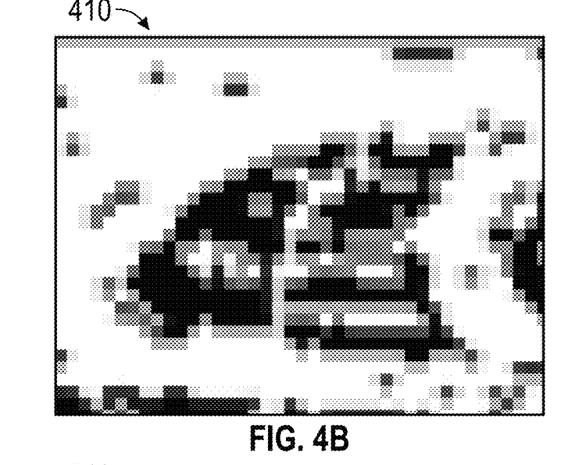
Figure 5A:
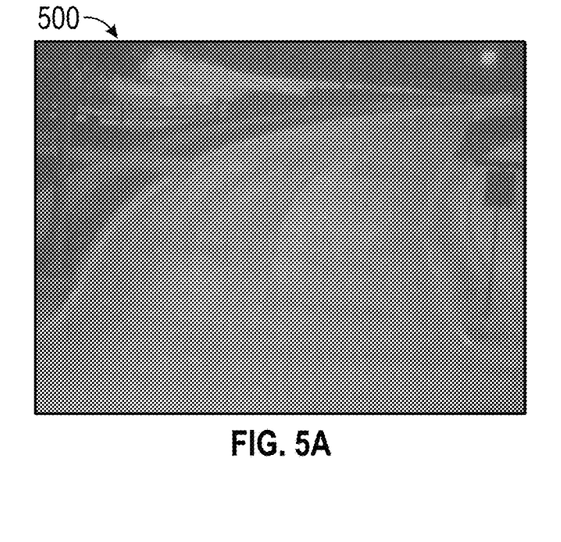
Figure 5B:
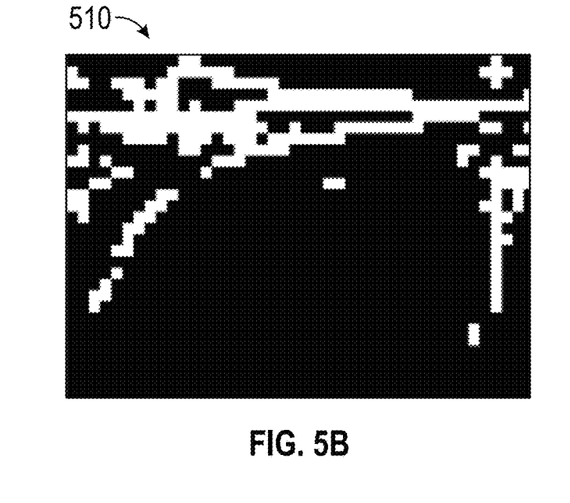
Figure 6A:
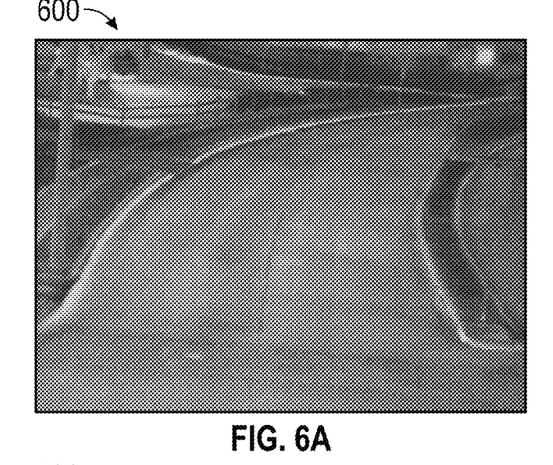
Figure 6B:
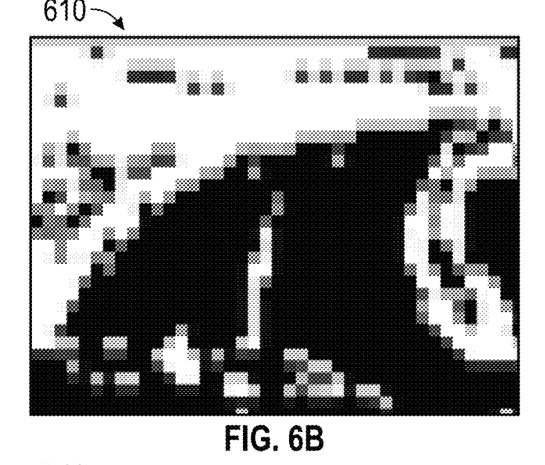
Figure 7A:
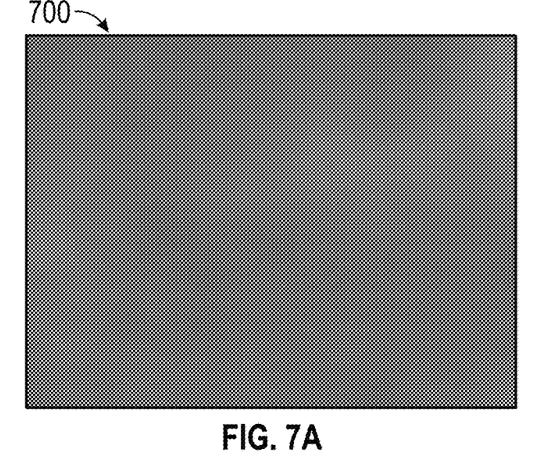
Figure 7B:
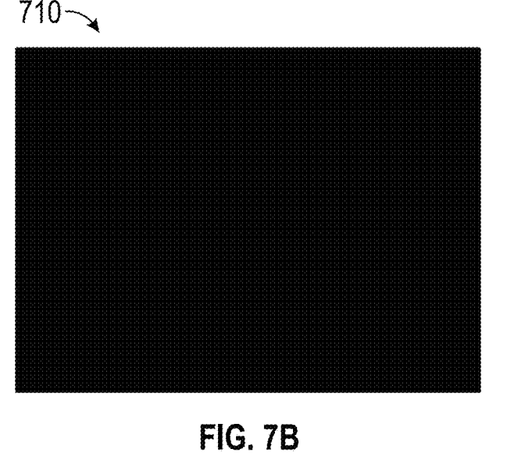

FIG. 4A illustrates a long term background image 400 generated in block 230. FIG. 4B illustrates a long term subsampled image 410 generated in block 240. FIGS. 5A, 6A, and 7A illustrate medium term background images 500, 600, and 700 generated in block 215. FIGS. 5B, 6B, and 7B illustrate medium term subsampled images 510, 610, and 710 generated in block 225. As shown, each of subsampled images 510, 610, and 710 include different representations of edges in comparison with long term subsampled image 410.

For example, medium term subsampled image 510 exhibits a 63% loss of edges in comparison with long term subsampled image 410. This large change suggests that a significant portion of the field of view of thermal camera 101 has recently become obscured and that a fail-safe mode of operation may be appropriate.

Medium term subsampled image 610 exhibits a 19% loss of edges in comparison with long term subsampled image 410. This large change suggests that a some portion of the field of view of thermal camera 101 has recently become obscured, and that a fail-safe mode of operation might be appropriate.

Medium term subsampled image 710 exhibits a 100% loss of edges in comparison with long term subsampled image 410. This entire change suggests that the entire field of view of thermal camera 101 has recently become obscured, and that a fail-safe mode of operation is appropriate.

In view of the examples shown in FIGS. 4A to 7B, it will be appreciated that the use of subsampled images to perform the edge comparison can provide a useful overall measure of image quality for purposes of determining a fail-safe mode of operation.

Referring again to FIG. 2, in block 265, if the edge changes between the medium term subsampled image and the long term subsampled image do not exceed a threshold amount associated with environmental effects (e.g., a minimum amount of edge loss typically associated with blockage caused by environmental factors), then the process returns to block 200 and processing component 110 continues to operate device 190 in accordance with object detection processing performed on captured thermal images.

However, if the edge changes between the medium term subsampled image and the long term subsampled image exceed the threshold amount associated with environmental effects (block 265), then processing component 110 switches to operating device 190 in accordance with a fail-safe mode (block 280). During this fail-safe mode, processing component 110 may operate device 190 in accordance with a predetermined timing sequence and/or in response to various other sensing components 150 without relying on the thermal images provided by thermal camera 101. In this case, processing component 110 may also operate alert component 160 (block 285) to notify a user that a fail-safe condition exists.

Referring now to the second comparison process, in block 270, processor 110 compares a short term subsampled image generated in block 255 with a long term subsampled image generated in block 240 to determine whether a security condition (e.g., human tampering) has possibly caused a change in the thermal images captured by thermal camera 101. In this regard, the short term subsampled image will include the subsampled edge details corresponding to the overall static features of scene 180 associated with the short time period (e.g., milliseconds or seconds). The long term subsampled image will include the subsampled edge details corresponding to the overall static features of scene 180 associated with the long time period (e.g., weeks or months).

If the edge details of the long term subsampled image are substantially the same as the edge details of the short term subsampled image, then it can be determined that thermal camera 101 has captured reliable thermal images over the short time period (e.g., the scene imaged over recent milliseconds or seconds substantially matches that of previous images captured over recent weeks or months).

However, if the edge differences determined in block 270 exceed a threshold security amount, processor 110 may determine that thermal camera 101 has not been capturing reliable thermal images over the short time period (e.g., the scene imaged over recent milliseconds or seconds significantly differs from that of previous images captured over recent weeks or months).

In some embodiments, the comparison of block 270 may be performed in any of the various ways discussed for block 260. In some embodiments, the comparison of block 270 may consider both the gain and loss of edges (e.g., the presence of a human hand covering aperture 102 or the repositioning of thermal camera 101 to view a different scene may result in the presence of greater or fewer edges in the short term subsampled images).

In block 275, if the edge changes between the short term subsampled image and the long term subsampled image do not exceed a threshold amount associated with a security condition (e.g., a minimum amount of edge loss or gain typically associated with human tampering), then the process returns to block 200 and processing component 110 continues to operate device 190 in accordance with object detection processing performed on captured thermal images. Otherwise, the process continues to blocks 280 and 285 as discussed to operate in a fail-safe mode and generate an alert.

In view of the present disclosure, it will be appreciated that by analyzing and comparing thermal images associated with different time periods, a control system (e.g., a traffic control system or other type of system) can effectively determine whether thermal imaging cameras are capturing reliable or unreliable thermal images. As a result, appropriate fail-safe operations and/or alerts may be triggered to ensure reliable operation of such control systems.

Other embodiments are also contemplated. For example, although three analytics processes are identified being associated with medium term, long term, and short term thermal images, greater or fewer numbers of such processes may be used. For example, in some embodiments, only environmental effects may be of interest, or only security conditions may be of interest. In other embodiments, additional conditions may be of interest. Also, although the comparisons of blocks 260 and 270 have been discussed in relation to subsampled images, non-subsampled edge images may be used for such comparisons in some embodiments where appropriate.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as program code and/or data, can be stored on one or more computer readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the present invention. Accordingly, the scope of the invention is defined only by the following claims.

What is claimed is:

1. A method comprising:
capturing a plurality of thermal images of a scene;
operating a device in an object detection mode;
processing the thermal images to generate first and second background images associated with first and second time periods to filter out changes in the scene occurring within the associated time periods;
edge filtering the first and second background images to generate first and second edge images;
comparing the first and second edge images to determine a change in edges associated with the scene;
determining, in response to the change in edges, that the thermal images exhibit degradation; and
changing the device from operating in the object detection mode to operating in a fail-safe mode in response to the determining that the thermal images exhibit degradation.

2. The method of claim 1, further comprising subsampling the first and second edge images prior to the comparing to remove edge translations between the first and second edge images.

3. The method of claim 1, wherein the first background image is generated by combining a plurality of the captured thermal images, wherein the second background image is generated by combining a plurality of the first background images.

4. The method of claim 1, wherein the change in edges is a first change in edges, the method further comprising:
processing the thermal images to generate a third background image associated with a corresponding third time period;
edge filtering the third background image to generate a third edge image;
comparing the second and third edge images to determine a second change in edges associated with the scene; and
determining, in response to the second change in edges, that the thermal images exhibit degradation.

5. The method of claim 4, further comprising subsampling the third edge image prior to the comparing the second and third edge images to remove edge translations between the second and third edge images.

6. The method of claim 4, wherein:
the comparing the first and second edge images comprises determining whether the first change in edges exceeds a first threshold amount associated with an environmental condition; and
the comparing the second and third edge images comprises determining whether the second change in edges exceeds a second threshold amount associated with a security condition.

7. The method of claim 4, wherein the first time period is less than the second time period and greater than the third time period.

8. The method of claim 7, wherein the first time period is in a range from one minute to one day.

9. The method of claim 1, further comprising:
performing object detection on the thermal images to detect an object of interest in the scene; and
wherein the operating a device in an object detection mode is performed in response to results of the object detection.

10. The method of claim 1, wherein the scene is a traffic intersection and the device is a traffic signal device.

11. A system comprising:
a thermal camera configured to capture a plurality of thermal images of a scene;
a memory component configured to store the thermal images and a plurality of machine readable instructions; and
a processor configured to execute the machine readable instructions to:
operate a device in an object detection mode;
process the thermal images to generate first and second background images associated with first and second time periods to filter out changes in the scene occurring within the associated time periods, edge filter the first and second background images to generate first and second edge images, compare the first and second edge images to determine a change in edges associated with the scene, determine, in response to the change in edges, that the thermal images exhibit degradation, and change the device from the object detection mode to a fail-safe mode in response to the determination that the thermal images exhibit degradation.

12. The system of claim 11, wherein the processor is configured to execute the machine readable instructions to subsample the first and second edge images prior to the compare to remove edge translations between the first and second edge images.

13. The system of claim 11, wherein the first background image is generated by combining a plurality of the captured thermal images, wherein the second background image is generated by combining a plurality of the first background images.

14. The system of claim 11, wherein the change in edges is a first change in edges, wherein the processor is configured to execute the machine readable instructions to:

process the thermal images to generate a third background image associated with a corresponding third time period;

edge filter the third background image to generate a third edge image;

compare the second and third edge images to determine a second change in edges associated with the scene; and determine, in response to the second change in edges, that the thermal images exhibit degradation.

15. The system of claim 14, wherein the processor is configured to execute the machine readable instructions to subsample the third edge image prior to the compare of the second and third edge images to remove edge translations between the second and third edge images.

16. The system of claim 14, wherein:

the compare of the first and second edge images comprises a determination whether the first change in edges exceeds a first threshold amount associated with an environmental condition; and the compare of the second and third edge images comprises determination whether the second change in edges exceeds a second threshold amount associated with a security condition.

17. The system of claim 14, wherein the first time period is less than the second time period and greater than the third time period.

18. The system of claim 17, wherein the first time period is in a range from one minute to one day.

19. The system of claim 11, wherein the processor is configured to execute the machine readable instructions to:

perform object detection on the thermal images to detect an object of interest in the scene; and operate the device in the object detection mode in response to results of the object detection.

20. The system of claim 11, wherein the scene is a traffic intersection and the device is a traffic signal device.

\* \* \* \* \*